United States Patent [19]

El-Hag

[11] 4,427,706
[45] Jan. 24, 1984

[54] METHOD FOR HEATING PAR-FRIED, BATTER-COATED FROZEN FOODS

[75] Inventor: Nabil A. El-Hag, Lake Peekskill, N.Y.

[73] Assignee: General Foods Corporation, White Plains, N.Y.

[21] Appl. No.: 244,431

[22] Filed: Mar. 16, 1981

[51] Int. Cl.³ .............................................. A23L 1/01
[52] U.S. Cl. .................................... 426/243; 426/438; 426/520; 426/523; 99/445; 99/448
[58] Field of Search ........................ 220/408; 126/390; 99/444, 445, 447, 448, 450; 426/113, 114, 119, 106, 523, 520, 438, 393, 241, 243

[56] References Cited

U.S. PATENT DOCUMENTS

| | | | |
|---|---|---|---|
| 2,049,481 | 8/1936 | Walterspiel | 219/35 |
| 3,211,082 | 10/1965 | Sachnoff et al. | 99/444 |
| 3,764,057 | 10/1973 | Reifers et al. | 99/174 |
| 3,986,445 | 10/1976 | Hooton | 99/426 |
| 4,027,583 | 6/1977 | Spanek et al. | 99/421 |
| 4,068,572 | 1/1978 | Vogt | 99/447 |
| 4,121,510 | 10/1978 | Frederick | 99/425 |
| 4,249,464 | 2/1981 | Hansen | 99/450 |
| 4,337,116 | 6/1982 | Foster et al. | 426/114 |

OTHER PUBLICATIONS

Cooking direction on a package of High Liner frozen Battercrisp ® Fish (a registered trademark of National Sea Products Corporation, Tampa, Florida).

Primary Examiner—Steve Alvo
Attorney, Agent, or Firm—Joyce P. Hill; Thomas R. Savoie; Daniel J. Donoval

[57] ABSTRACT

A method and tray assembly is provided for heating, in a conventional household oven, batter-coated and par-fried frozen comestibles conveniently supported or held in a substantially vertical position. Vertical orientation is such that a three-dimensional comestible having a length, width or circumference and thickness is situated so that a plane of thickness is parallel to the bottom of the tray. The novel tray assembly maximizes convective or microwave heating of the comestible products, minimizes conductive heat transfer, and also permits the user to minimize the surface area of the comestible available for moisture collection during heating. The tray assembly comprises: a tray having upstanding support elements which fixedly engage the comestible in a substantially vertical position, a means to allow heated air to convectively heat the food products, and a means serving to collect oil and liquids released by the products during heating.

12 Claims, 4 Drawing Figures

U.S. Patent    Jan. 24, 1984    4,427,706
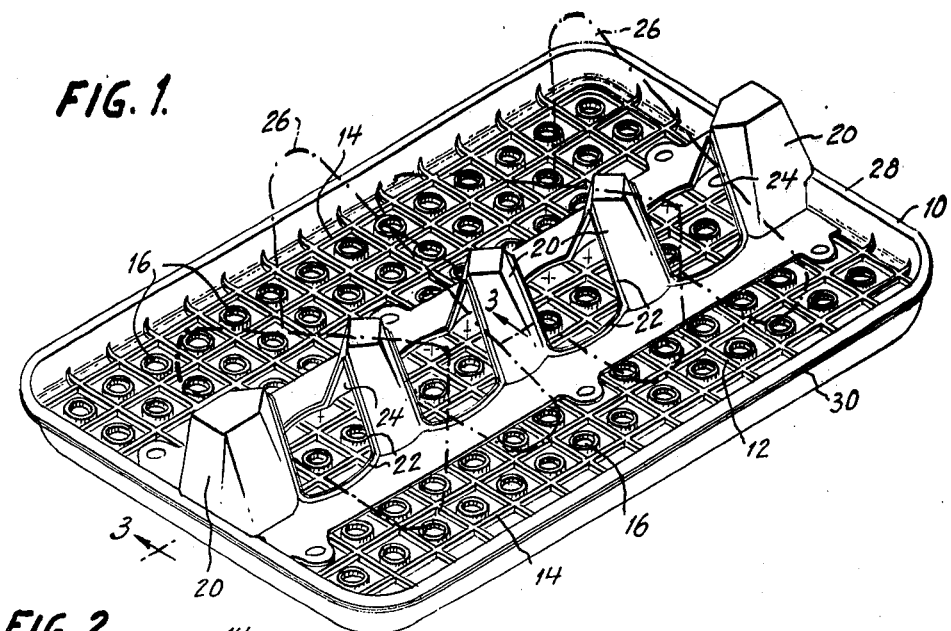
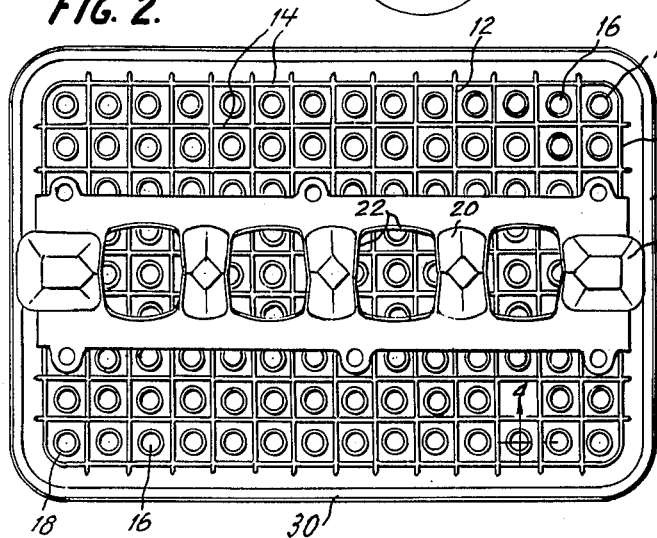
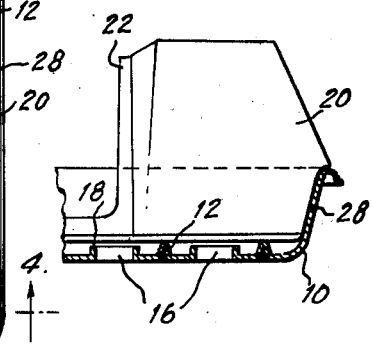
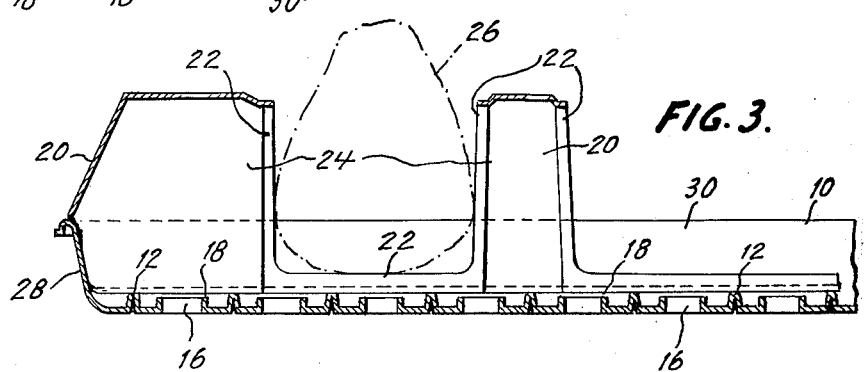

METHOD FOR HEATING PAR-FRIED, BATTER-COATED FROZEN FOODS

TECHNICAL FIELD

Batter-coated and par-fried frozen foods, such as seafoods, chicken and vegetables, have been widely accepted as convenience foods which may be taken from the freezer and heated in a thermostatically-controlled household oven on a baking sheet without additional processing by the consumer. The quality of these products has heretofore been substantially inferior to that which may be achieved by the consumer battering the foodstuff followed by deep-fat frying. It has been determined that a major difference between reheating batter-coated and par-fried frozen foods on a solid surface baking sheet and deep-fat frying is that the primary means for heat transfer to a foodstuff which is supported on a baking sheet in an oven is via conduction, whereas the primary means for heat transfer to a foodstuff in a deep-fat fryer is via fluid convection (i.e., circulation of heated oil). Furthermore, it is taught in U.S. Pat. No. 4,068,572 that when a high-velocity stream of heated gas is passed over all sides of the product in a heat-insulated housing, the resulting heated product has vastly superior taste qualities to foodsuffs heated in conventional containers (e.g., pots, pans, cookie sheets).

In addition, U.S. Pat. No. 3,986,445 discloses a baking rack which supports the object being baked in a manner that permits heated air to uniformly cook the interior and exterior surface of the object being baked. More recently, U.S. Pat. No. 4,121,510 discloses a combination cooking rack and pan primarily for use with microwave ovens that is designed to act as a support platform for separating the food being cooked from the bottom or cooking surface of the oven so that a more uniform heat radiation and heat circulation around the food is effected. Thus, it is suggested in the prior art references cited that uniform, convective heating improves the quality of the finished product. It might be predicted that an object that was suspended in the oven such that heated air could freely circulate around the entire surface of the object would receive the most uniform heating.

None of the above prior art devices designed for the convective heating of foodstuffs is directed to reheating batter-coated and par-fried frozen foodstuffs.

Obviously, it is not practical to individually suspend frozen, par-fried foodstuffs in a conventional household oven and, in fact, it would not even be desirable to do this as frozen, par-fried foodstuffs contain a significant amount of oil and other liquids which will exude or drip from the foodstuff as it is heated. Oil deposits on the oven surface not only create an aesthetic problem (i.e., dirty oven), but also can be the cause of oven fires. A common solution employed by the housewife to collect drippings that occur in the oven is the use of aluminum foil. The cooking directions on a package of High Liner frozen Battercrisp® Fish (a registered trademark of National Sea Products Corporation, Tampa, Florida) suggest that batter-coated and par-fried frozen fish be placed on a wire rack having a tray underneath the rack for oven reheating. Such a technique would result in oil accumulating on the tray receptacle. It should also be noted that foil or a tray, either placed directly below a rack or even on the shelf below said rack, will impede the uniform flow of heated air past all surfaces of the supported foodstuff which will not then develop a quality deep-fat-fried product because of uneven heat transfer and a build-up of moist, humid air between the drip pan and product. Further, the use of a separate foil sheet or tray receptacle is neither a convenient procedure nor all that effective in preventing the development of a greasy oven. It would, therefore, be desirable to develop methods and/or devices which would maximize convective heat on all food surfaces to improve the quality of oven-reconstituted, frozen, batter-coated, par-fried foodstuffs without adding to the time or effort the consumer must expend.

DISCLOSURE OF THE INVENTION

A method and tray assembly is provided for heating, in a household oven, batter-coated and par-fried, frozen comestibles so that the batter coating has a uniformly deep-fried appearance and crisp texture and the inner portion of the comestible is moist and sufficiently cooked.

It is, accordingly, among the principle objects of this invention to provide for supporting and holding a batter-coated and par-fried frozen foodstuff in a substantially vertical position to subject same to uniform heat and thereby improve crispness and taste of the cooked product. Batter-coated and par-fried frozen comestibles have a substantially rigid exoskeletal structure and may be supported in a substantially vertical plane during heating. The vertical plane is essentially perpendicular to a support platform designed to receive foodstuffs and/or collect the oils and liquids exuded therefrom during cooking; this support platform is hereinafter referred to as the "bottom of the tray."

As employed herein, "vertical orientation" is meant to include any arrangement wherein a three-dimensional comestible having an identifiable length, width or circumference and thickness can be situated so that a plane of thickness is parallel to the bottom of the tray; further, said thickness is in a horizontal plane.

Thickness is defined as the smallest of three dimensions which include a length and a width or, in the case of a cylindrical comestible, a circumference. For example, a fish fillet having a triangular or rectangular shape has a length, width and thickness. The thickness of the fillet is the smallest of the three dimensions and, when positioned in a horizontal plane, the fillet is characterized as being "on-edge," but more accurately as described herein, the fillet is "vertically oriented." In the case of a cylindrical object, such as a batter-coated hotdog, the three dimensions are length, circumference and thickness. Vertical orientation, for purposes of this invention, means that the batter-coated hotdog is positioned "on-end" so that the plane of thickness is parallel to the horizontal plane of the cooking device. As a practical limitation, the linear measurement of the thickness facing the bottom of the tray is less than three inches (7.6 cm).

Vertical positioning of a supported comestible exposes a greater portion of the comestible to one heating medium, e.g., circulation of heated air. Exposure to one heating medium assures uniform eating quality and a relatively consistent texture throughout the portion of the comestible that is heated in a uniform manner.

Another principle feature of the invention is that supporting foodstuffs in a substantially vertical position enables more food to be cooked in an oven at the same time than by conventional methods wherein foods are placed flat in a pan.

It is still another object of the invention to provide a technique for the reconstitution of a batter-coated, frozen comestible in a comparatively economical manner.

It is still another object of the invention to provide such a technique which is convenient to use.

Briefly, these and other objects which will appear are achieved in accordance with the invention, as follows.

A substantially rigid foodstuff is oriented vertically on a tray by means of spaced-apart, upstanding support elements affixed to the bottom of the tray. The upstanding support elements are adapted to receive the food and fixedly engage the food in a vertical plane which is essentially perpendicular to bottom of the tray.

The tray and vertically oriented foodstuff is placed in a household oven, which may be a thermostatically-controlled gas, electric or convection oven, a microwave oven, or combinations thereof. The appropriate heating cycle is determined by temperature probes, a timer, thermostat, or by other means so that the heating of the comestible in the oven is for a time effective to produce an appetizing product with the desired degree of internal doneness. A person skilled in the art will recognize that with the variety of ovens available for heating, it is appropriate to manipulate time and temperature requirements for the various ovens and comestibles. In the case of a batter-coated and par-fried frozen comestible, the use of a convection oven having a source of radiant heat, in combination with the tray and process of this invention, produces a batter-coated product having a uniform deep-fried appearance and a batter coating with a crisp texture which is organoleptically at parity with its deep-fat-fried, fast food counterpart.

It is to be particularly noted that the present invention requires the use of a novel tray assembly which may or may not have side walls. The tray has a means for collecting liquids which are released from the comestible during oven heating and are deposited on the solid surface of the tray. "Collecting" as used herein includes absorption of liquids similar to a wick or blotter. The collection of liquids is done in such a manner that no portion of the comestible remains in contact with a significant amount of free liquid.

In a preferred embodiment, the tray has a plurality of apertures distributed over its surface such that the apertures contain greater than 10% open area, typically from 10-30%, based on the total horizontal area of the tray surface. The tray has upwardly-projecting rims around each of the apertures so that substantially none of the liquid collected on the solid surface of the tray will pass through the apertures in the tray. More preferably, the tray has apertures which are surrounded by a tapered projecting rim which may be substantially frustoconical in shape. The apertures with the tapered, upwardly-projecting rim provides a means of increasing the convective flow of hot air through the bottom of the tray.

In one embodiment, the bottom of the tray has an array of raised ridges to enhance the rigidity of the tray structure and support the comestible at a height designed to separate the comestible being heated from the apertured or solid bottom surface. The raised ridges also function, if necessary, to support the comestibles on the ridge crests and thereby reduce the amount of conductive heat transferred thereto, in comparison to what would occur if the comestible rested on a flat surface.

The raised ridges can extend in one or more directions or they can be a set of concentric circles. In one embodiment, the plurality of raised ridges form a grid-like structure, consisting of straight lines intersecting at right angles with the spacing between the lines being substantially equal. This configuration of raised ridges is such that each aperture is surrounded by four encompassing ridges. The raised ridges extend to a height greater than the upwardly-projecting rims surrounding the apertures and direct the food secretions released by the foodstuff during heating to the solid surface of the tray bottom. Also, in the preferred embodiment, the raised ridges in conjunction with the raised fins surrounding each aperture serve to form troughs around the apertures to collect oil and other secretions released by the food products during heating. These troughs effectively prevent the liquids from dripping into the oven.

In all embodiments of the novel tray assembly, affixed to the bottom of said tray are spaced-apart, upstanding support elements. For purposes of the present application, the term "affixed" refers to elements which are mounted on or integral with the tray bottom. The upstanding support elements contain apertures that permit the flow of heated air from below the apertured bottom of the tray out through the support apertures, thereby enhancing the convective heating of food surfaces in close proximity to the support elements. Even if the bottom of the tray is without apertures, openings in the upstanding support elements serve to enhance convective heating of food surfaces near the apertures in the supports. Without openings in the upstanding support elements, dead air space would form on the underside of each support. This would contribute to uneven cooking of the food surface close to this support element. Another desirable feature of the affixed, upstanding support elements is that the portion of the element that engages the comestible is resilient and flexible.

The tray may be constructed of any suitable materials which can hold or absorb liquids, such as metals used in the manufacture of permanent types of cooking pans and vessels, thin gauge aluminum foil, paperboard, natural fibers, or synthetic materials, in either disposable or permanent-type structures. It is preferred that the tray surface be made of a material which will absorb liquids at a rate faster than liquid is released from the comestible during heating. Moreover, the tray may be darkly colored, which would have the effect of increasing the radiant heating when an oven is used. As is well known in the art, cooking receptacles of metallic materials positively should not be used in ovens of the microwave type. Therefore, if the tray assembly of this invention is to be used in a microwave oven, the device should be made of a nonmetallic material. The tray assembly of this invention is preferably fabricated from economical materials which can withstand oven temperature, e.g., paper, pulverized wood, polymeric materials or the like, so that the entire device may be disposed of in its entirety after its intended use, thereby eliminating normally required cleaning or maintenance. It also permits a much more hygienic method of food preparation since the original devices may be stored or contained within clean, relatively sterile packages until time for use in the actual cooking of the food. It is also contemplated that the tray assembly can be made of a disposable material and packaged with the frozen comestible prior to distribution. Of course, for thermostatically-controlled electric or gas ovens that may be heated up to a temperature above 300° F., an ovenable material is required.

BRIEF DESCRIPTION OF THE DRAWINGS

The foregoing description and advantages of this invention for reheating comestible products in accordance with the teachings herein may be more readily understood by one skilled in the art, having reference to the following detailed description of several preferred embodiments thereof, taken in conjunction with the accompanying drawings in which like reference numerals are used to refer to identical elements throughout the several views, and in which:

FIG. 1 is a perspective view showing the tray assembly used to support fish pieces during reheating (fish in dotted lines);

FIG. 2 is a top planar view of a convective heating tray of FIG. 1, constructed pursuant to the teachings of the preferred embodiment of the present invention;

FIG. 3 is an enlarged sectional view along line 3—3 of FIG. 1 showing the upstanding support elements on the tray.

FIG. 4 is an enlarged cross-sectional view of a portion of the tray bottom taken along line 4—4 of FIG. 1.

BEST MODE FOR CARRYING OUT THE INVENTION

The present invention is particularly described with respect to a frozen fish product, a batter-coated and par-fried fish fillet, but it should be apparent to those skilled in the art that the teachings herein have other applications; for instance, to the preparation of substantially rigid meats and vegetable products suitable for oven cooking.

Referring to the drawings in detail, FIG. 1 illustrates the tray assembly being used to cook fish fillet. For this purpose, the tray 10 constructed in accordance with the teachings herein has a grid-like configuration of raised ridges impressed upon its surface. The grid-like design includes a first plurality of parallel ridges 12 and a second plurality of parallel ridges 14, with the intersecting first and second pluralities of ridges 12 and 14 forming a grid-like design in the surface of the tray 10. A plurality of apertures 16 are provided in the tray surface, with each aperture being surrounded by four encompassing ridges. A frustoconically-shaped, upwardly-projecting rim 18 is provided around each aperture 16, as illustrated best in FIGS. 2-4, with each frustoconical rim rising to a fraction of the height of the ridge crests. The upstanding support elements 20 are used to fixedly engage a batter-coated and par-fried fish fillet. When the tray containing the vertically-oriented fish fillets is placed in an oven for cooking, the upwardly-projecting rims 18 function to increase the convective flow of heated air through the apertures by providing a chimney effect for each aperture. The structure of each upwardly-projecting rim rises to only a fraction of the height of the encompassing ridge crest such that it does not provide contact with the fish fillet placed on the tray. The tray has side walls 28 provided along its widthwise dimension and side walls 30 provided along its lengthwise dimension, with each side wall being creased upwardly through a bend of approximately 80° with respect to the tray surface. A plurality of apertures may be provided in each of the four side walls of the tray structure to further assist in the convective flow of heated air around the comestible products placed on the tray.

The grid-like design of raised ridges in the tray surface enhances the rigidity of the final structure, in addition to minimizing heat transfer by conduction to the comestibles. The particular grid-like design illustrated herein is selected to provide support for comestible products 26 arranged to be supported across the ridge crest or fixedly engaged by fins 22 between the upstanding support members 20.

The particular grid-like design illustrated in the embodiment of FIGS. 1 and 2 has a square shape for each four joining ridges. In alternative embodiments, the shapes formed by adjoining ridges may form triangles or other polygonal figures, or alternatively they may be circular in shape. Likewise, the apertures provided for convective flow may be round, square, oval, etc., with the size of each aperture in general being selected in accordance with the size of the grid pattern or distance between single-row ridges. Moreover, the apertures, if present in the tray bottom, have open spaces greater than 10% of the tray assembly surface area.

The raised ridges 12 and 14 also provide for the collection of oil and liquids released by the comestible during heating, the liquids dripping from the comestible follow the contour of the ridged surface and are directed to the solid surface area of the tray. In this manner a continuous film of oil or liquid will fill each collection cavity or be absorbed by the tray surface during usage of the tray with comestibles subject to the release of liquids during heating. The upwardly-projecting rim 18 around each aperture 16 prevents the flow of liquids through the opening of the aperture. Therefore, despite apertures being present, little or no oil will drip from the comestible through the tray assembly.

FIG. 3 illustrates another view of the present invention, wherein the detail of the upstanding support element 20 is illustrated. A flexible, resilient fin 22 fixedly engages a comestible 26 "on-edge" or "on-end" in a substantially vertical position. Heated air flows through apertures 24 in the upstanding support element 20, thereby enhancing the convective heating of food surfaces in close proximity to the upstanding support elements. The convective air flow is greater if the tray bottom also contains apertures 16.

This embodiment of the invention is particularly suited for oven heating par-fried, batter-coated comestibles which have an essentially flat configuration. Meat cutlets, fish fillets or portions, onions rings, vegetable slices (e.g., eggplant) are among the foodstuffs which may be utilized in the method and apparatus of this invention. According to the method of the invention, the foodstuff, which has a thickness of from 0.25 to 3.0 inches (0.6 to 7.6 cm), is set on edge such that the thickness is parallel to the bottom of the tray. Desirably, the foodstuff will extend in the vertical direction at a distance of at least 2 inches (5.1 cm), more preferably at least about 3 inches (7.6 cm), and at least 1.5 times, more preferably at least 3 or 5 times, the thickness of the foodstuff.

The comestibles which will obtain the greatest benefit from this invention are those wherein the foodstuff has a high moisture content (above about 30% by weight) and will exude substantial amounts of moisture during thawing or heating in an oven. Typical of these foodstuffs are batter-coated, par-fried, frozen fish in which the fish flesh has a moisture content of above about 80% by weight and which has a cellular structure which loses much of its ability to retain moisture upon freezing and/or cooking.

Illustrative of the invention, a total of 30 frozen fish fillets of uniform thickness, about ½" (1.3 cm), and having a triangular shape are batter coated, par-fried and frozen in a conventional manner. The average triangular dimensions of the fillet, before batter is applied, is 4¼"×2¾"×5" (10.8 cm×7.0 cm×12.7 cm). The average weight per fillet is 43 grams. Two methods (A, B) plus the method of this invention (C) are used to support the frozen fish fillet while reheating to the desired degree of doneness in a thermostatically-controlled, electric oven. Measurements given herein are for the fish fillet without a batter coating. It is understood that the batter coating will change the actual surface area dimensions; however, for directional purposes, reference is made to the fish measurements without batter.

In method A, the frozen fillet is laid flat on a metal baking pan. In method B, the frozen fillet is laid flat on an apertured tray without upstanding support elements, having a tray bottom similar to the tray shown in FIG. 1 herein. As used herein, "laid flat" refers to placing the plane of thickness perpendicular to the bottom of the tray. In method C, the frozen fillet is supported vertically on the tray assembly described herein. Each heating cycle involves placing two frozen, batter-coated and par-fried fillets on the specified support platform, heating the oven to a temperature of about 375° F. (191° C.) and placing the fillets and support platform in the heated oven for 25–30 minutes.

During heating of batter-coated and par-fried, frozen comestibles, some of the water contained in the comestible migrates to the hot air exposed surfaces and evaporates into the surrounding environment. In addition, most of the internal moisture in the comestible will, under the influence of gravity, flow towards the bottom surface. The gravity-induced migration of moisture in the fillet to the large flat side of fish on the baking pan occurs faster than the collected moisture can be evaporated.

It is known that a greater amount of moisture collects in the bottom surface because the cell walls are being destroyed by heat denaturization and mechanical damage to cells caused by ice crystal formation. As a result, the cells lose their ability to retain water and large amounts of moisture drain to the bottom surface. While heating, the bottom surface is essentially soaking in liquids that are draining from the interior of the frozen fillet. The moisture in the bottom horizontal surface of the fillet in contact with the tray softens the batter coating which has been partially fried and partially denatured by hot oil before freezing. The batter coating absorbs the released moisture during reheating because the batter starches can still be gelatinized. The combination of a moist batter coating and greater conductive heat transfer to the bottom surface of the fillet gives a wet, soggy, mushy batter coating on the bottom surface. If an attempt is made to eliminate the soggy bottom by extending the cooking time, the bottom surface in contact with the tray will become "pasty" as the batter starches gelatinize and the batter becomes more dense, hard, crusty and even sticks to the pan and burns at the various contact points. Batter surfaces that are not in contact with the metal pan are soggy in texture. Thus, a fish fillet prepared according to method A and heated in an attempt to dry out the bottom batter-coated surface has a bottom surface with portions that are hard, crusty and burnt where the batter sticks to the pan; in addition, there are portions of the batter coating that are soggy. When the cooked fillet is eaten, each bite-size portion has a nonuniform consistency comprising the partially-pasty, burnt bottom surface in contact with the pan and a top surface which is drier, crispier and has a deep-fat-fried appearance.

In method B, the same moisture migration phenomenon occurs in the frozen fillet during heating as is described in method A except that by using an apertured tray in method B, the liquid which accumulates in the bottom surface is partially drained away. The openings in the bottom of the tray allow liquids to escape and also expose the bottom surface to more of a convective flow of heated air, thereby permitting evaporation of some of the liquids into the surrounding environment. After heating the frozen fillet laid flat on an apertured tray, each bite-size portion still has a nonuniform consistency comprising a significantly different top and bottom surface of the batter coating. The bottom surface of the coating is less soggy, not as dense as the batter coating in method A. Also, the coating in method B has less stickiness and gelatinization of the batter coating due to less direct contact with a flat baking surface; in contrast, the top surface is drier, crispier and has a deep-fatfried appearance.

In method C, vertical orientation of the fish fillet is such that one edge (i.e., the thickness) of the fillet faces the bottom of an apertured tray described herein made of an ovenable, absorbent, molded pulp. The fish surface area facing the bottom of the tray is about 2.6 square inches per fillet. The fish surface areas (6.2 square inches each side) exposed to hot air are in a vertical plane and extend perpendicularly from the bottom of the apertured tray to a height of approximately 2.7 inches (6.8 cm). During heating, more moisture migrates to and evaporates from the hot air exposed surfaces rather than to the small portion of the fillet facing the bottom of the tray. Moisture which does migrate to the lowest portion of the fillet quickly passes through the batter coating due to the relatively high porosity of edge crust and is preferably drained away, as in this example, by using a tray made of an absorbent material. Thus, the moisture that accumulates in the horizontal edge of the fillet has less opportunity to create a soggy bottom crust. Each bite-size portion has a relatively consistent texture and, in fact, texture is relatively consistent throughout the fillet except for what was the edge of the fillet facing the bottom of the tray.

After heating 30 fish fillets to the desired degree of internal doneness, reported below in Table I are organoleptic evaluations and average measurements of moisture content, after cooking, in the surface area of the side of the fillet in contact with or facing each support platform. The total surface area of each fillet has an average measurement of 19.7 square inches. Five separate heating cycles having two fillets per cycle are completed using methods A, B and C.

TABLE 1

| | Electric Oven Preparation of Fish Fillets at 375° F. (191° C.), 30 minutes | | | |
|---|---|---|---|---|
| Method of Heating | Support Platform | Surface Area/Fillet Facing Support Platform (sq. in.) | Texture After Heating | % Moisture in Batter of Surface Facing Support Platform* |
| A | Metal tray | 6.2 | crisp side; combination of soggy, burnt, crusty side which | 31 |

TABLE 1-continued

Electric Oven Preparation of
Fish Fillets at 375° F. (191° C.), 30 minutes

| Method of Heating | Support Platform | Surface Area/Fillet Facing Support Platform (sq. in.) | Texture After Heating | % Moisture in Batter of Surface Facing Support Platform* |
|---|---|---|---|---|
| B | Apertured Tray without Vertical Supports | 6.2 | adheres to pan at contact points crisp side; soft, slightly soggy, slightly burnt side | 22 |
| C | Apertured Tray with Vertical Supports | 2.6 | uniformly crisp | 15 |

*The surface area per fillet in contact with the metal tray (A) is almost three times the surface area of the fillet edge (C) and the batter coating contains more than twice the amount of moisture per unit area.

Fifty consumers evaluated the crispness of the batter coating for the fillets prepared by methods B and C. Thirty-seven consumers rated the batter coating of product prepared by method C as crispier. Seven consumers indicated that they perceived as crispier the batter coating of the product prepared by method B; six consumers detected no difference in crispness of batter coatings. Thus, seventy-four percent of the consumers confirmed that the vertical orientation method for heating batter-coated and par-fried fish fillets disclosed herein gives a desirably crisp batter coating.

The above description is for the purpose of teaching the person skilled in the art how to practice the present invention. The detailed drawings and specific examples are not intended to detail all of the obvious modifications and variations of the invention which will become apparent to the skilled worker upon reading. However, Applicant does intend to include all such obvious modifications and variations within the scope of his invention which are defined by the following claims.

What is claimed is:

1. A method of heating, in an oven, batter-coated and par-fried, frozen, three dimensional comestibles, which method produces a uniformly deep-fried appearance and crisp texture of the batter coating while the interior portion of the comestible is moist and sufficiently cooked, said method comprising:
   (a) orienting vertically the batter-coated and par-fried frozen comestible on a tray by means of spaced-apart, upstanding support elements affixed to said tray, said elements fixedly engaging the comestible, and said elements containing apertures, said tray having a plurality of apertures distributed over its surface and said tray having a surface which consists of an ovenable, nonmetallic material which will absorb liquids in such a manner that no portion of the comestible remains in contact with free liquid;
   (b) placing the tray and vertically oriented comestible into said oven;
   (c) heating the oven whereby heated air passes through the tray apertures and around all surfaces of the comestible in order to convectively heat the comestible, said tray apertures containing greater than 10% open area based on the horizontal area of the tray surface area and wherein heated air passes through said support element apertures from below the bottom surface of the tray and out through said support element apertures thereby enhancing the convective flow of heated air;
   (d) heating the comestible in the oven for a time effective to produce an appetizing batter-coated product having a deep-fried appearance and coating;
   (e) collecting, by means of the adsorbent surface of the tray, the liquids which are released from the comestible during oven heating, said tray containing upwardly-projecting rims around each of the apertures so that substantially no liquids will pass through the apertures in the tray.

2. The method of claim 1 wherein each aperture has a substantially circular shape and each projecting rim is substantially frustoconical in shape.

3. The method of claim 1 wherein the portion of the upstanding support element that engages the comestible is resilient and flexible.

4. The method of claim 1 wherein the bottom of the tray has an array of raised ridges on its upper surface to enhance the rigidity of the tray structure and support the comestible at a height designed to separate the comestible being heated from the apertured tray surface.

5. The method of claim 4 wherein the array of raised ridges has a configuration such that each aperture is surrounded by four encompassing ridges.

6. The method of claim 4 wherein the raised ridges extend to a height greater than the upwardly-projecting rims.

7. The method of claim 1 wherein the vertical orientation of the comestible is such that the thickness is situated so that the plane of thickness is parallel to the bottom of the tray and the linear measurement of the thickness facing the bottom of the tray is less than three inches.

8. The method of claim 7 wherein the batter-coated, frozen comestible is a piece of fish.

9. The method of claim 1 wherein the tray is placed in a thermostatically-controlled gas or electric oven.

10. The method of claim 1 wherein the tray is placed in a microwave oven.

11. The method of claim 1 wherein the tray is disposable and is packaged with the frozen comestible.

12. The method of claim 1 wherein the tray has four sidewalls.

* * * * *